(12) United States Patent
Riemers

(10) Patent No.: US 9,330,100 B2
(45) Date of Patent: May 3, 2016

(54) PROTOCOL INDEPENDENT MIRRORING

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 963 days.

(21) Appl. No.: 12/393,965

(22) Filed: Feb. 26, 2009

(65) Prior Publication Data

US 2010/0228774 A1 Sep. 9, 2010

(51) Int. Cl.
*G06F 17/30* (2006.01)
*G06F 7/00* (2006.01)

(52) U.S. Cl.
CPC .............................. *G06F 17/30067* (2013.01)

(58) Field of Classification Search
USPC ........................................................ 707/770
See application file for complete search history.

(56) References Cited

U.S. PATENT DOCUMENTS

| | | | |
|---|---|---|---|
| 6,611,849 B1* | 8/2003 | Raff | G06F 17/30575 |
| 2002/0103816 A1* | 8/2002 | Ganesh | G06F 11/2066 |
| 2005/0114412 A1* | 5/2005 | Gerhard | G06F 17/30212 |
| 2006/0179218 A1* | 8/2006 | Burkey | G06F 11/2069 |
| 2006/0218224 A1* | 9/2006 | Agrawal | G06F 17/30578 |
| | | | 709/201 |
| 2007/0028139 A1* | 2/2007 | Wahl | G06F 9/50 |
| | | | 714/6.31 |
| 2007/0288247 A1* | 12/2007 | MacKay | G06Q 10/00 |
| | | | 705/1.1 |
| 2008/0022058 A1* | 1/2008 | Nadathur | G06F 11/1458 |
| | | | 711/162 |
| 2008/0094247 A1* | 4/2008 | Milne | E21B 34/16 |
| | | | 340/855.4 |
| 2009/0106328 A1* | 4/2009 | Callaway | G06F 11/1641 |
| 2010/0235323 A1* | 9/2010 | Zhang | G06F 19/321 |
| | | | 707/623 |

* cited by examiner

*Primary Examiner* — Shyue Jiunn Hwa
(74) *Attorney, Agent, or Firm* — Lowenstein Sandler LLP

(57) ABSTRACT

A method and apparatus including a mirror module to reviewing a data request, check a local data archive for the requested data, and send a request to a remote archive in response to a failed check for the requested data in the local data archive, the local data archive having a matching structure to the request data archive. The mirror module checks whether requested data available in the local data archive is valid. The local data archive is update with data received from the remote data archive in response to the data request. Data requests can be received and serviced for a plurality of protocols by a plurality of mirror modules using the local data archive.

12 Claims, 3 Drawing Sheets

PROTOCOL INDEPENDENT MIRRORING

TECHNICAL FIELD

Embodiments of the present invention relate to a method and system for providing as-needed and protocol independent mirroring. Specifically, the embodiments of the invention provide a method and system for providing a protocol independent mirror that utilizes an overlay file system to update the content of the mirror on an as needed basis.

BACKGROUND

Mirrors are servers that replicate data that is present on an original or primary server. The use of mirror servers decreases the demand on the primary server and enables the service of more requests for the data being provided by the primary server. Mirrors can be set up to move data closer to a set of intended recipients such as setting up a mirror on a local network to provide data that is on a primary server on a distant remote network. The data provided by mirrors is a full replication of the data available on the primary server. This requires that the full set of data provided by a primary server be copied over to the mirror.

The data on the primary server is likely to change over time. These changes necessitate that the mirrors be periodically updated. The updating of the mirrors is accomplished by either broadcasting a full set of data or all changes to the data to each mirror in response to any change in the data on a primary server or by each mirror requesting this data at regular intervals from the primary server. This results in a bottle neck at the primary server, especially, if there are a large number of mirrors. It is difficult for each of the mirrors to obtain the data that is necessary to completely update their local data to match that which is available on the primary server. As a result, many of the mirrors are never or seldom completely up to date.

There are other services that offer similar functionality to mirrors such as caching proxies. Caching proxies track requested data for a primary server. However the caching proxies do not replicate the directory structure of the primary server. This limits their ability to support more than one protocol. A caching proxy for an FTP site will only be able to service FTP requests. The data that is available at the caching proxy cannot be accessed through other types of protocols such as NFS, HTTP or other protocols. Another system that is similar to a mirror system is a global file system. A global file system shares a file system across the network using a dedicated protocol and a requisite storage scheme. Data in this system is not accessible by other protocols or storage systems.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for a system and process for protocol independent mirroring. A protocol independent mirroring system utilizes an overlay file system to store a local copy of a data archive from a primary server that is to be mirrored. Any number of mirror modules that support requests for different types of transfer protocols are then provided by the mirroring system server to service requests for data from the archive. Support for any number of protocol types can be provided to enable access to the data archive, because the overlay file system storing the data archive provides a complete reproduction of the original data archive in terms of its file structure. However, the mirror module only retrieves data from the data archive on the primary server when the data is not current or available in the overlay file system, at which point, the overlay file system is updated. This alleviates the load on the primary server as it does not have to continuously update each of the mirror servers with a full set of data or all changes to the data archive.

Figure 1:
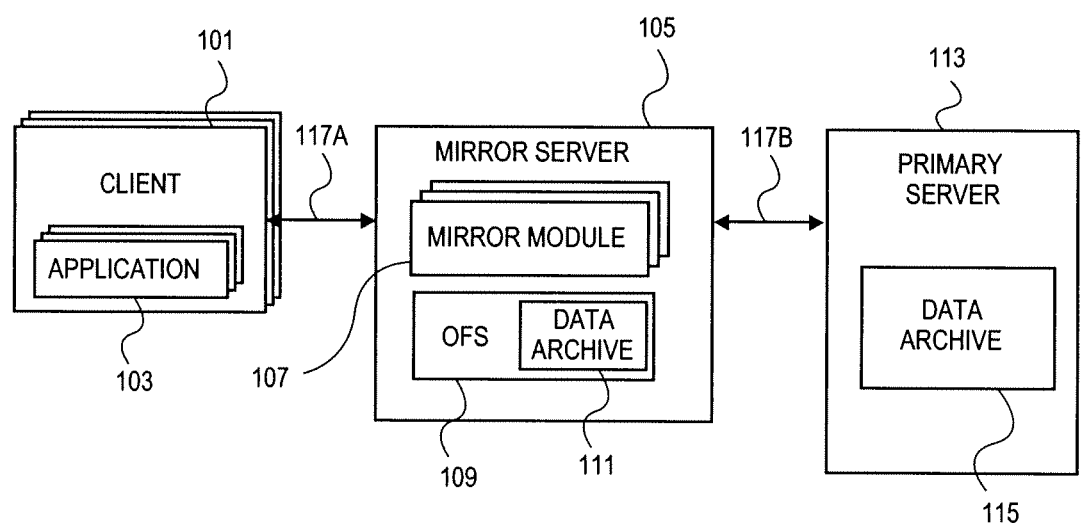
FIG. 1 is a diagram of one embodiment of a protocol independent mirroring system.

FIG. 1 is a diagram of one embodiment of the protocol independent mirroring system. The protocol independent mirroring system includes at least one mirror server 105, a remote or primary server 113, and set of clients 101. A "set," as referred to herein can be any positive whole number of items, including one item. "Protocol independent," as referred to herein, indicates that the mirroring system can support any protocol, because the mirror server 105 replicates the structure of the primary server 113. The mirror server 105 can service any request of any protocol, because it can access requested data in the same manner as the primary server 113 based on the replication of the structure of the primary server 113. The mirror server 105 and the primary server 113 can be connected by a network 117B. The client 101 and mirror server are also connected by a network 117A. A network 117A,117B can be a local area network, a wide area network, such as the Internet, or any other type of network. The network can have any number of wireless and wired components and connections or links.

A client 101 can be any type of computing device, including a desktop computer, a laptop computer, a work station, a handheld device, a console device, or similar computing device. The client 101 can execute any number of applications 103. These applications 103 can generate requests for data in the data archive 115 on the primary server 113. The applications 103 use the network connection 117A and the mirroring server 105 to request this data. The applications 103 can use any transfer protocol, including hypertext transfer protocol, file transfer protocol, or similar protocols. Similarly, the applications 103 can utilize the file system protocol structures and processes, such as network file system (NFS) or other similar file system structures and processes. The file structure of the mirror server 105 can be an overlay file system 109 that can be mounted on the client 101.

Mirror server 105 provides any number of mirror modules 107, each of which services a particular transfer protocol or file system type. The mirroring server 105 can execute or support any number of mirror modules 107. The overlay file system 109 replicates the file structure of the primary server 113 and stores aspects of the data archive 111. The overlay file system 109 is utilized to store those aspects of the data archive 115 that have been requested through the mirror modules 107. In one embodiment, the overlay file system 109 can be utilized to store more than one data archive 111 or multiple overlay file systems can be hosted by the same server 105 to provide access to multiple data archives on different primary servers. The mirror modules 107 access the primary server 113 over the network 117B.

The primary server 113 can be any type of computing device, including a desktop computer, a laptop computer, work station, dedicated server, handheld device, console device, or similar computing device. The primary server 113 provides access to a remote data archive 115 that is ultimately accessed by applications 103 on the client 101. The data archive 115 can store any type of information and can use any file system or file structure. The primary server 113 can be connected to any number of mirroring servers 105 to provide access to the data archive 115. The primary server 113 can also be accessed directly by client computer 101. The primary server 113 can have a server application or program that provides access and services the requests for access to the data archive 115. Any number of such server applications can be provided to service different types of transfer protocol and file system access requests from clients 101 and mirroring servers 105.

In another embodiment, multiple levels of mirroring servers can be positioned between a client 101 and a primary server 113. In this case, each of the mirroring servers 105 tracks the topology of the mirror server 105 and primary server 113 structure to ensure that forwarded requests and messages are not trapped in a cycle. Each of the mirror modules 107 can handle this network structure management independently. In another embodiment, a separate network structure management module tracks the topology and adjusts message forwarding to avoid cycles.

Figure 2:
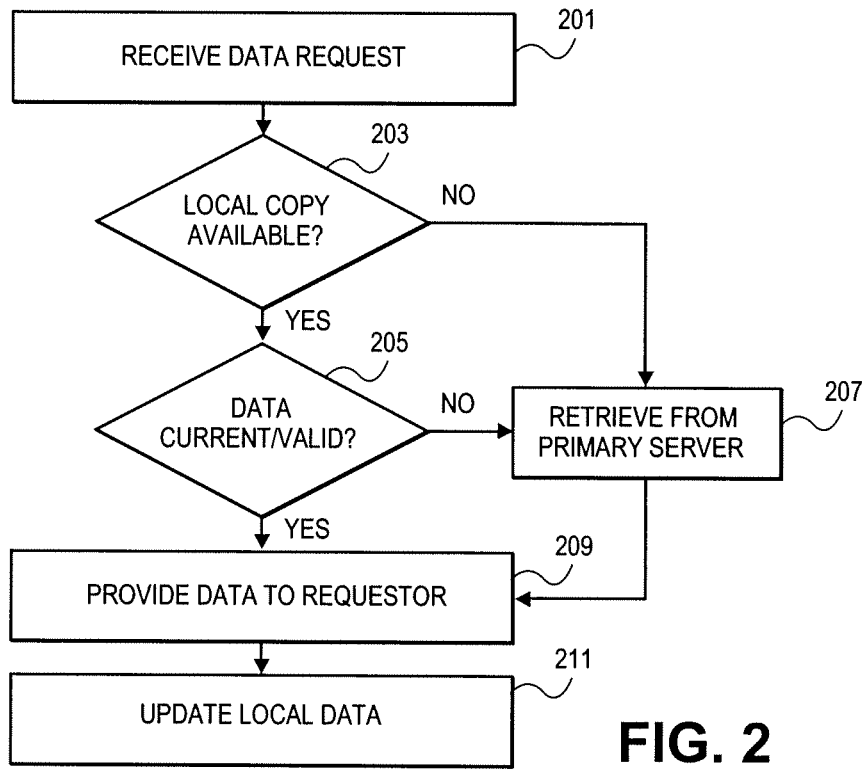
FIG. 2 is a diagram of one embodiment of a process for servicing data requests in the protocol independent mirroring system.

FIG. 2 is a flowchart of one embodiment of a process for data request management by a mirror module. In one embodiment, the process is initiated by receiving a data request from a client computer or client application (block 201). The data request can be in any format, such as a system access request or a transfer protocol request. The mirror module then parses the request to determine which file is to be accessed or which data block is to be accessed on a data archive. Once the file is identified, then a check can be made of the overlay file system to determine if a copy of that file is available in the local data archive (block 203).

If the copy of the requested file is not available in the local data archive, then the mirror module can retrieve the data from the primary server (block 207). The mirror module makes this request using the transfer protocol or file system request structure that was utilized by the client to access the mirror module. In another embodiment, the mirror module uses a separate, protocol different protocol or system request to access the primary server. The mirror module then provides the data that is received from the primary server or from another mirror module or mirroring server to the requestor (block 209). The data will be returned to the requesting application or client machine using the transfer protocol or file system protocol or structure that was utilized to make the request. The mirror module then also updates the local overlay file system to store the retrieved data in the local copy of the data archive (block 211).

If a copy of the requested file or block of data is available (block 203), then a check is made to determine whether or not the data in the local archive is current or valid (block 205). The data can be determined to be current or valid if the time stamp of the local copy is below a threshold age (e.g. data that was retrieved less than a day, hour or minute previously or similar time frame) or is similarly deemed to be recent. In another embodiment, the mirror module sends a verification request to the primary server to determine whether or not the local copy of the requisite data is identical with the copy of the data on the primary server. This check can be by comparison of checksum values or similar low bandwidth technique. If the locally stored data is not current, then the mirror module generates a request for the data that is sent to the primary server (block 207). Once the primary server responds with the requested data, the data is then provided to the requesting application and client machine (block 209). Received data is also used to update the local data archive in the overlay file system (block 211).

If the local data is available and current, then the mirror module retrieves the data from the local data archive in the overlay file system and provides it to the requesting application or client machine (block 209). In most cases, if the data is available and current, then it is not required to update a the local data archive, however, if as a part of the data validation or verification process a query to the primary server is made, then the local data archive can be updated by updating the metadata for the data archive to reflect that the requested data was still current or valid at the time of the request, which can be used to reset a time window or similar fastener or technique for determination of the future threshold checks for the data being current or valid. Updates the metadata assist in subsequent request evaluation.

This process is executed as a 'real-time' process. The data archive on the mirror server is updated on an as needed basis at the time of a data request. Thus, the data archive is maintained and updated in real-time as opposed to a periodic schedule for maintaining and updating of the data archive. The update of the data archive in real-time supports the protocol independence of the mirror server by enabling the data archive at the mirror server to function in the same manner and have the same functional structure as the data archive of the primary server even though all of the data or the complete structure may not be present prior to a request for any particular data.

Figure 3:
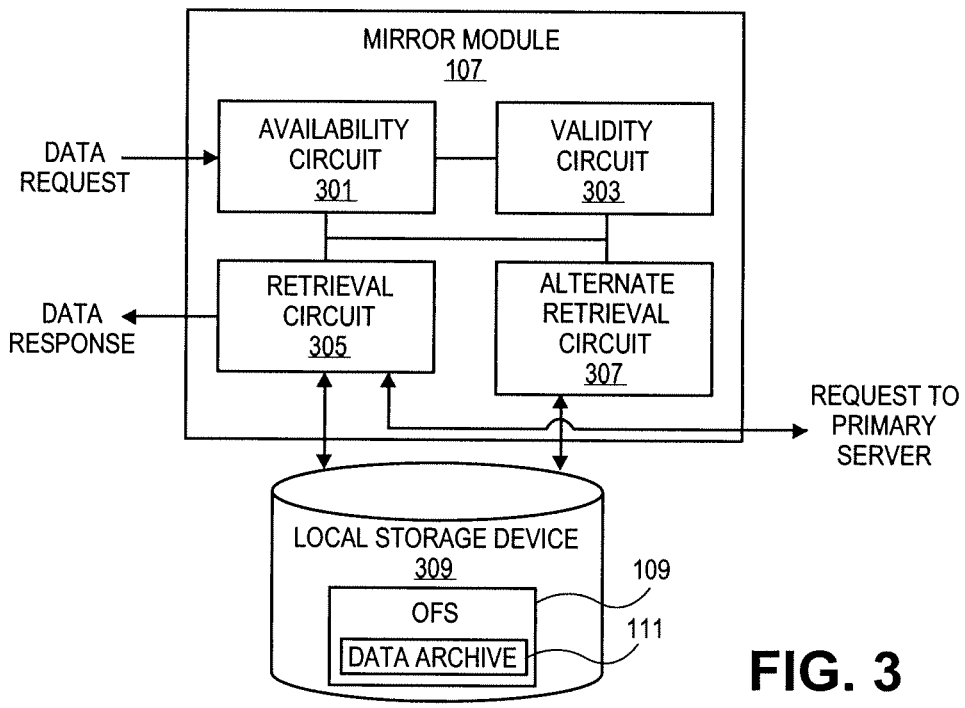
FIG. 3 is a diagram of one embodiment of a mirror module in the protocol independent mirroring system.

FIG. 3 is a diagram of one embodiment of a mirror module 107. The mirror module 107 includes an availability circuit 301, a validity circuit 303, a retrieval circuit 305, and an alternative retrieval circuit 307. One skilled in the art would understand that the set of functions and structures described herein is by way of example and that the function and structure could be combined into large or more complex structures or broken down into smaller structures. The mirror module 107 receives a data request from a client, which is first checked or processed by the availability circuit 301. The availability circuit 301 interfaces with a retrieval circuit 305 to access the local storage device 309. The local storage device 309 houses the overlay file system 109 and the data archive 111. The local storage device 309 can be any type of persistent storage device, including a fixed disk drive, an optical drive, a flash drive, or similar persistent storage device. The retrieval circuit 305 interfaces with the overlay file system 109 to determine whether the requested file or data is present in the data archive 111.

In one embodiment, a set of metadata files can be present in the local storage device 309, either in the overlay file system or in data archive 111. Metadata tracks which portions of the data archive 111 are present locally and which are not. The metadata can also provide other data regarding the files and data on the data archive 111 including time stamps or the date of the retrieval of the respective portions of the data archive 111. The retrieval circuit 305 returns either the metadata or an acknowledgment of the availability of the required data to the availability circuit 301. The availability circuit 301 then passes the request to the validity circuit 503 to determine whether the local data is valid.

The retrieval circuit 305 attempts to retrieve the requested file from the overlay file system. If the file is not present, then the retrieval circuit initiates a request for the data from the primary server and upon receiving the requested data stores it in the overlay file system and returns it to the requesting application or client machine through a data response.

The validity circuit 303, upon a determination of the availability of a file in the local data archive, checks the time stamp and makes a determination of the validity of the data in the file. This validity check can be through a comparison of the time stamp with a threshold or window during which the data in the file is deemed to be valid. For example, a data file can be determined to be valid if less than a specified time period has elapsed. If the validity circuit 303 determines that the data is not valid, then control passes back to the retrieval circuit 305 to retrieve the requested data from the primary server and return it to the requesting client.

An alternative retrieval circuit 307 can interface with the other circuits and manage a scheduled, periodic or similar retrieval of data from the primary server. The alternative retrieval circuit 307 can act in conjunction with the other components of the mirror module in terms of updating the data archive, thereby providing a hybrid between an entirely real-time retrieval and the periodic or scheduled retrieval.

Figure 4:
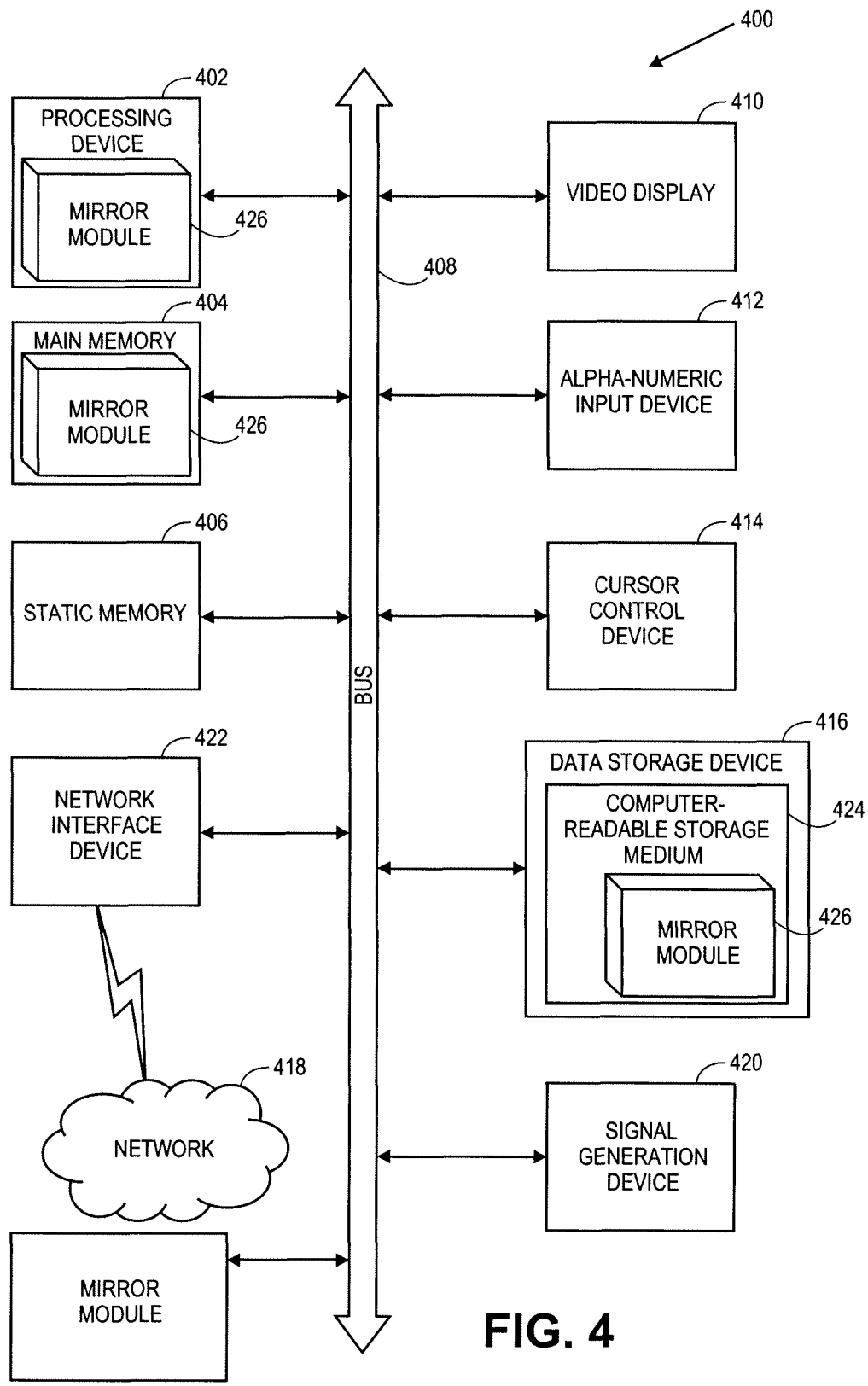
FIG. 4 is a diagram of one embodiment of a protocol independent mirroring system.

FIG. 4 is a diagram illustrating one embodiment of a protocol independent mirroring system. Within the computer system 400 is a set of instructions for causing the computer or other machine to perform any one or more of the methodologies discussed herein. In alternative embodiments, the computer system 400 can be connected (e.g., networked) to other machines in a LAN, an intranet, an extranet, or the Internet. The computer system 400 can operate in the capacity of a server or a client machine (e.g., a client computer executing the mirror module or a server computer executing a primary data archive) in a client-server network environment, or as a peer machine in a peer-to-peer (or distributed) network environment. The machine can be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computer or other machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g. a data storage device in the form of a drive unit, which can include fixed or removable computer-readable medium), which communicate with each other via a bus 408.

The processing device 402 represents one or more general-purpose processing devices such as a microprocessor, central processing unit, or the like. More particularly, the processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 402 can also be one or more special-purpose processing devices such as an application specific integrated circuit (ASIC), a field programmable gate array (FPGA), a digital signal processor (DSP), network processor, or the like. The processing device 402 is configured to execute the mirror module 426 for performing the operations and steps discussed herein.

The computer system 400 can further include a network interface device 422. The computer system 400 also can include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 can include a machine-readable storage medium (or more specifically a computer-readable storage medium) 424 on which is stored one or more sets of instructions (e.g., the mirror module 426) embodying any one or more of the methodologies or functions described herein. The mirror module 426 can also reside, completely or at least partially, within the main memory 404 and/or within the processing device 402 during execution thereof by the computer system 400, the main memory 404 and the processing device 402 also constituting machine-readable storage media. The iterative compound hashing function 426 can further be transmitted or received over a network 418 via the network interface device 422.

The machine-readable storage medium 424 can also be used to store the mirror module 426 persistently. While the machine-readable storage medium 426 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention can be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "reviewing," "checking," "sending," "updating," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which can be coupled to a computer system bus.

The algorithms and displays presented herein are not inherently related to any particular computer or other apparatus. Various general purpose systems can be used with programs in accordance with the teachings herein or it can prove convenient to construct more specialized apparatus to perform the required method steps. The required structure for a variety of these systems has been described in the description above. In addition, the present invention is not described with reference to any particular programming language. It will be appreciated that a variety of programming languages can be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in micro-coded hardware components.

Thus, a method and apparatus for protocol independent mirroring has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a mirror server comprising a plurality of mirror device modules each to service a request in a different transfer protocol of a plurality of transfer protocols, a request for data in a first transfer protocol of the plurality of transfer protocols from a client device, wherein the mirror server replicates data of a primary server;
   identifying a first mirror device module of the plurality of mirror device modules to service the request for data in the first transfer protocol;
   checking, by the processing device of the mirror server, a local data archive of the mirror server for a local copy of the requested data, wherein the local data archive is in an overlay file system;
   determining, by the processing device, that the local copy of the requested data stored in the local data archive of the mirror server is invalid;
   sending, by the processing device of the mirror server, a request for the requested data to a remote data archive of the primary server in response to the determining, the local data archive having a matching structure to the remote data archive;
   receiving, by the processing device of the mirror server, the requested data from the primary server; and
   sending, by the processing device of the mirror server, the requested data to the client device.

2. The method of claim 1, further comprising:
   updating the local data archive with data received from the remote data archive memory in response to the request for data.

3. The method of claim 1, further comprising:
   periodically updating the local data archive from the remote data archive.

4. The method of claim 1, further comprising:
   checking for cycles in mirror server topology for the request.

5. The method of claim 1, wherein the local copy of the requested data stored in the local data archive of the mirror server is validated in view of a time threshold.

6. A non-transitory computer readable medium having instructions stored therein, which when executed cause a processing device of a mirror server to:
   receive, by the processing device of a mirror server comprising a plurality of mirror device modules each to service a request in a different transfer protocol of a plurality of transfer protocols, a request for data in a first transfer protocol of the plurality of transfer protocols from a client device, wherein the mirror server replicates data of a primary server;
   identify a first mirror device module of the plurality of mirror device modules to service the request for data in the first transfer protocol;
   check, by the processing device of the mirror server, a local data archive of the mirror server for a local copy of the requested data, wherein the local data archive is in an overlay file system;
   determine, by the processing device, that the local copy of the requested data stored in the local data archive of the mirror server is invalid;
   send, by the processing device of the mirror server, a request for the requested data to a remote data archive of the primary server in response to the determining, the local data archive having a matching structure to the remote data archive;
   receive, by the processing device of the mirror server, the requested data from the primary server; and
   send, by the processing device of the mirror server, the requested data to the client device.

7. The non-transitory computer readable medium of claim 6, the processing device to:
   update the local data archive with data received from the remote data archive memory in response to the request for data.

8. The non-transitory computer readable medium of claim 6, the processing device to:
   periodically update the local data archive from the remote data archive.

9. The non-transitory computer readable medium of claim 6, the processing device to:
check for cycles in mirror device server topology for the request.

10. The non-transitory computer-readable medium of claim 6, wherein the local copy of the requested data stored in the local data archive of the minor server is validated in view of a time threshold.

11. A system comprising:
a memory to store a local data archive; and
a processing device of a mirror server operatively coupled to the memory, the mirror server comprising a plurality of mirror device modules each to service a request in a different transfer protocol of a plurality of transfer protocols, the processing device to:
receive a request for data in a first transfer protocol of the plurality of transfer protocols from a client device, wherein the mirror server replicates data of a primary server;
identify a first mirror device module of the plurality of mirror device modules to service the request for data in the first transfer protocol;
check the local data archive of the mirror server for a local copy of the requested data, wherein the local data archive is in an overlay file system,
determine that the local copy of the requested data stored in the local data archive of the mirror server is invalid;
retrieve a remote copy of the data from the remote data archive in response to determining that the local copy of the requested data stored in the local data archive of the mirror server is invalid,
update the local data archive memory to comprise the local copy of the data, the local data archive having a file structure matching the remote data archive;
receive, by the processing device of the mirror server, the requested data from the primary server; and
send, by the processing device of the mirror server, the requested data to the client device.

12. The system of claim 11, the processing device to periodically update the local data archive.

* * * * *